United States Patent

Meyer et al.

[11] Patent Number: 5,991,113
[45] Date of Patent: Nov. 23, 1999

[54] SLIDER WITH TEMPERATURE RESPONSIVE TRANSDUCER POSITIONING

[75] Inventors: Dallas W. Meyer, Burnsville; Paul E. Kupinski, Eagan, both of Minn.; Joseph C. Liu, Singapore, Singapore

[73] Assignee: Seagate Technology, Inc., Scotts Valley, Calif.

[21] Appl. No.: 08/833,590

[22] Filed: Apr. 7, 1997

[51] Int. Cl.⁶ .................................................. G11B 21/02
[52] U.S. Cl. .............................................. 360/75; 360/103
[58] Field of Search .............................. 360/122, 75, 103, 360/105, 109

[56] References Cited

U.S. PATENT DOCUMENTS

| | | |
|---|---|---|
| 3,180,944 | 4/1965 | Stover . |
| 3,276,003 | 9/1966 | Stover . |
| 3,632,900 | 1/1972 | Karzwell ................................. 360/103 |
| 3,706,861 | 12/1972 | Giel ......................................... 360/103 |
| 3,732,552 | 5/1973 | Walraven ................................. 360/75 |
| 3,863,124 | 1/1975 | Pierce et al. ............................ 318/638 |
| 4,605,977 | 8/1986 | Matthews ................................. 360/103 |
| 4,669,011 | 5/1987 | Lemke ..................................... 360/103 |
| 4,814,908 | 3/1989 | Schmitz ................................. 360/77.02 |
| 4,843,502 | 6/1989 | Tagawa ................................... 360/105 |
| 4,853,810 | 8/1989 | Pohl et al. ............................. 360/103 |
| 5,021,906 | 6/1991 | Chang et al. ........................... 360/103 |
| 5,034,828 | 7/1991 | Ananth et al. ........................... 360/75 |
| 5,111,348 | 5/1992 | Baba ..................................... 360/77.06 |
| 5,255,135 | 10/1993 | Itoh et al. ................................ 360/75 |
| 5,256,850 | 10/1993 | Maegawa et al. ................... 219/121.69 |
| 5,276,573 | 1/1994 | Harada et al. ........................ 360/75 X |
| 5,282,190 | 1/1994 | Maruo et al. ............................ 369/115 |
| 5,307,224 | 4/1994 | Minase ................................... 360/105 |
| 5,313,352 | 5/1994 | Chikazawa et al. ..................... 360/103 |
| 5,341,256 | 8/1994 | Murata et al. ............................ 360/75 |
| 5,764,432 | 6/1998 | Kasahara ................................. 360/75 |

FOREIGN PATENT DOCUMENTS 57-210479  12/1982  Japan ....................................... 360/75

OTHER PUBLICATIONS

Patent Abstracts of Japan, vol. 15, No. 11, Yamaki, Method and Device for Measuring Friction Degree, Jan. 10, 1991.

*Primary Examiner*—Andrew L. Sniezek
*Attorney, Agent, or Firm*—Frederick W. Niebuhr

[57] ABSTRACT

A device for reading and recording magnetic data includes an aerodynamically supported slider with an air bearing surface, and a transducer mounted to the slider for movement toward and away from the air bearing surface responsive to changes in the slider operating temperature. In one embodiment, the transducer movement is primarily due to a difference in thermal expansion coefficients between a transducing region of the slider incorporating the transducer, and the remainder of the slider body. In another embodiment, a strip of thermally expansive material is incorporated into the slider near the transducer to contribute to the displacement by its own expansion. A temperature control circuit, coupled to the strip of thermally expansive material or to a resistance heating element on the slider, employs a variable current source to control the slider temperature and transducer displacement. Nominal slider operating temperatures can be set to achieve a predetermined transducer flying height, to compensate for variations in flying heights among batch fabricated sliders. Optionally, a temperature sensor can be employed to measure the slider operating temperatures and provide a temperature sensitive input to the temperature control circuit.

33 Claims, 8 Drawing Sheets

SLIDER WITH TEMPERATURE RESPONSIVE TRANSDUCER POSITIONING

BACKGROUND OF THE INVENTION

The present invention relates to data storage devices that employ aerodynamically supported transducing sliders for reading and recording magnetic data, and more particularly to structure and circuitry for controlling the flying heights of magnetic data transducers carried by such sliders.

In typical magnetic data storage devices, magnetic disks with flat recording surfaces are mounted rotatably and magnetic data transducing heads are positioned in close proximity to the recording surfaces, each head movable generally radially with respect to its associated disk. In higher capacity devices, the disks are rotated at high speeds to create an air cushion or bearing that supports each transducing head at a controlled distance from its associated recording surface. The transducing heads contact their associated disks only when the disks are either stationery, accelerating from a stop, or decelerating to a complete stop.

Designers of magnetic disks continually strive to increase the density at which the magnetic data can be stored. One factor that limits storage densities is the transducing head flying height. As discrete data storage areas are placed more closely to one another, the transducer must be positioned more closely to the recording surface to distinguish between adjacent storage areas. In recent year, transducing head flying heights have been decreased from levels greater than about 10 microinches, to levels of less than about 4 microinches, largely due to improved techniques for reducing media surface roughness. Further reductions in flying height are enabled by a super smooth polishing of media surfaces in data recording areas while also providing an adjacent head contact zone, textured to avoid stiction problems. An example of this approach is shown in U.S. Pat. No. 5,062,021, (Ranjan et al) assigned to the assignee of this application.

There are several factors that limit the reduction in slider flying height. These fcctors might reasonably be ignored at flying heights of about 10 microinches, but would become major concerns at flying heights on the order of 1–2 microinches. These include variations in the sliders themselves, variations in the structure that supports the sliders, and media surface roughness.

More particularly, normal tolerances in slider fabrication lead to structural variations among the sliders in any given batch. Consequently, thie flying heights of sliders in the batch are distributed over a range, although the flying height of each slider individually is substantially constant.

Variations in supporting structure occur primarily in the transducer support arm, the suspension or gimballing structure, slider geometry and load arm. These variations influence the flying height, and the nature of a given slider's reaction to any disturbances, e.g. due to shock or vibration.

Disk roughness also becomes more of a problem at lower slider flying heights. With maximum peaks more likely to protrude into a normal range of slider operation, the probability of unintended and damaging slider/disk contact increases. The risk of damage from these discontinuities is greater at lower slider flying heights.

Thermal effects also are exaggerated by minute slider flying heights. Thermal effects include the natural tendency of materials to expand when heated, quantified by a temperature coefficient of thermal expansion more conveniently called a thermal expansion coefficient. Materials with higher coefficients expand more in response to a given temperature increase. When materials having different thermal expansion coefficients are contiguous and integral, their differing expansion when heated leads to elastic deformations and elastic restoring forces in both of the materials. Reduced flying heights increase the need to take thermal expansion and thermally induced elastic deformation into account.

One proposed design of a slider would drag on the disk surface, thereby more precisely fixing a head/disk spacing based on a peak roughness of the disk surface. Any improvement in setting the transducer/recording surface gap, however, would be at the cost of excessive wear to the slider, media recording surface, or both.

Several patents discuss the use of piezoelectric material in a slider, to adjust the position of a transducer mounted to the slider. For example, U.S. Pat. No. 5,021,906 (Chang et al) discloses a programmable air bearing slider with a deformable piezoelectric region between leading edge and trailing edge regions. The deformable region is controlled electrically to change the angle between the leading and trailing regions, thus to change the position of a transducer mounted to the trailing region.

U.S. Pat. No. 4,853,810 (Pohl et al) concerns a magnetic transducing head including a body and a piezoelectric layer adjacent the body. The piezoelectric layer is operable to control the head/disk gap, based on sensing a tunnel current across the gap between the recording surface and a tunnel electrode on the slider.

In U.S. Pat. No. 4,605,977 (Matthews), a cantilevered beam mounted to a slider supports a magnetic transducer at its free end. The beam includes a flexible vein and piezoelectric transducers on opposite sides of the vein, used in combination with a piezoelectric driver to adjust the position of the magnetic transducer.

The piezoelectric sliders are difficult to fabricate. Large activation voltages are required for piezoelectrically deforming materials a sufficient aLmount to control the transducer position. Piezoelectric deformation schemes can take thermal expansions and elastic deformations into account indirectly, but cannot be employed to limit or otherwise influence these phenomena.

Therefore, it is an object of the present invention to provide a magnetic transducing slider incorporating non-piezoelectric means to control the flying height of a magnetic transducer carried by the slider, independently of the flying height of the slider.

Another object of the invention is to mount a magnetic transducer to an air bearing slider body in a manner that enables controllably adjusting the transducer position relative to the slider body by controlling an operating temperature of the slider.

A further object is to provide a magnetic data transducing apparatus in which positionable adjustments of a magnetic transducer, relative to a slider body carrying the transducer, are controlled at least in part responsive to sensing slider temperature.

Yet another object is to provide a process for selecting a spacing between a magnetic transducer and an air bearing surface of the slider carrying the transducer, to achieve substantial uniformity in transducer flying heights among multiple sliders, despite a variance in the corresponding slider flying heights.

SUMMARY OF THE INVENTION

To achieve the above and other objects, there is provided an air bearing slider. The slider includes a slider body having an air bearing surface for aerodynamically supporting the slider body in an operating position in which the air bearing surface is spaced apart from a data surface of a magnetic data reading and recording medium, by a nominal flying height. A magnetic transducer is supported with respect to the slider body near the air bearing surface, for movement toward and away from the air bearing surface in response to changes in an operating temperature of the slider body proximate the transducer. A transducer spacing control means is provided for controlling the operating temperature when the slider body is in the operating position. This adjusts a position of the transducer relative to the air bearing surface, thereby to adjust a separation distance between the transducer and the data surface independently of the nominal flying height.

In one preferred approach, the control means include a resistance heating element mounted to the slider body. This element is advantageously used in connection with a transducer incorporated within a transducing region substantially encapsulated in the slider body. The slider body and transducing region have different thermal expansion coefficients whereby the position of the transducer is determined primarily by the differences in expansion, as the slider is heated.

In another preferred approach, the heating element is composed of a thermally expansive and electrically conductive material mounted to the slider body near the transducer, to provide a thermal expansion region with a higher thermal expansion coefficient than the slider body. The material thermally expands when subject to a bias current and elastically expands adjacent material, thus to play a direct role in determining transducer position.

In connection with either approach, a temperature sensing means can be used to determine the slider body temperature, and provide values based on temperature to the variable current source that adjusts the operating temperature. This provides servo control and facilitates responding to changes in the ambient temperature of the reading and recording apparatus.

Thus, another aspect of the present invention is a magnetic data reading and recording apparatus that includes a magnetic data transducing slider with a slider body having an air bearing surface, and a transducer mounted with respect to the slider near the air bearing surface for movement toward and away from the air bearing surface. A slider support means aerodynamically supports the slider body proximate a data surface of a magnetic data reading and recording medium with the air bearing surface spaced apart from the data surface by a nominal distance. A temperature sensing means is provided for sensing an operating temperature of the slider body and generating temperature values based on the operating temperature. A transducer positioning means is operably coupled to the sensing means for controlling a position of the transducer with respect to the air bearing surface responsive to the temperature values.

Thus in accordance with the present invention, the flying height of a magnetic transducer can be controlled independently of a flying height of the slider body to which the transducer is mounted. This affords a means for fine tuning the transducer position, and permits maintenance of a low transducer flying height, e.g. from a fraction of a microinch to about 2 microinches, while simultaneously maintaining the slider body at a more distant minimum spacing or flying height, e.g. 3–10 microinches. Accordingly the advantages of a reduced transducer flying height are achieved without unduly exposing the slider to damage arising from disk roughness, tolerances in the slider or its supporting structure, or turbulence in the air bearing. Changes in ambient temperature can be taken into account by sensing the temperature and controlling the transducer position in response to the temperature readings. The result is a slider flying height sufficiently large to ensure stability, in combination with a transducer flying height reduced to allow higher data storage densities.

IN THE DRAWINGS

For a further appreciation of the above, and other features and advantages, reference is made to the following detailed description and to the drawings, in which.

DETAILED DESCRIPTION OF THE PREFERRED EMBODIMENTS

Figure 1:
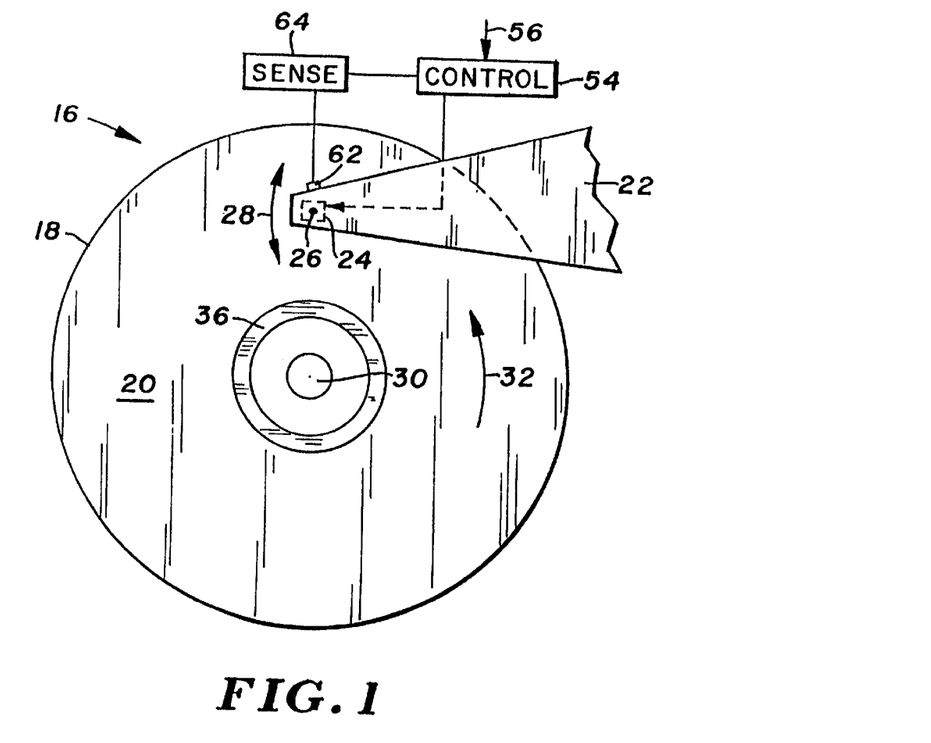
FIG. 1 is a partial schematic view of a magnetic data reading and recording device constructed in accordance with the present invention.
Figure 2:
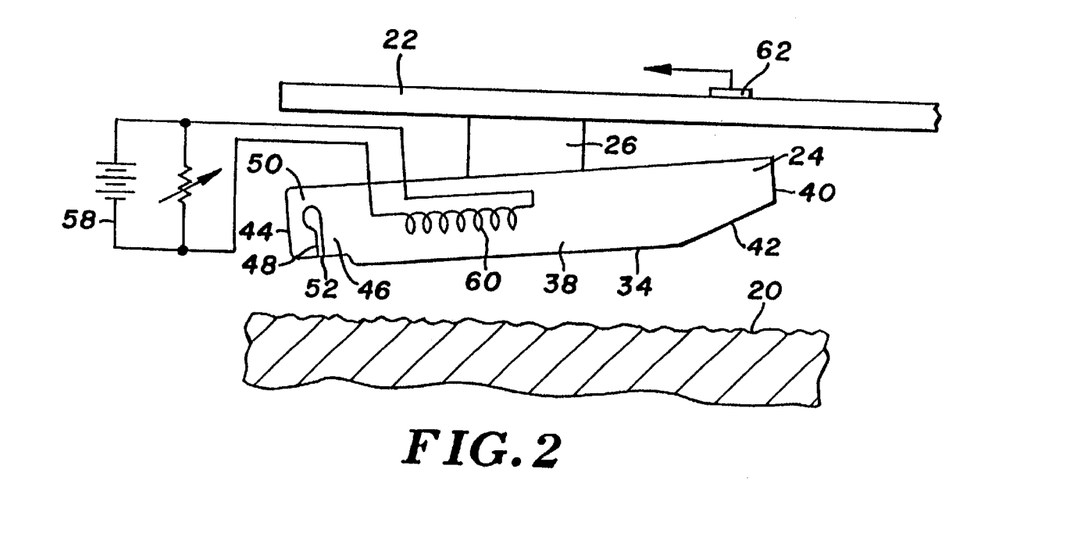
FIG. 2 is a partial schematic elevation of the device.

Turning now to the drawings, FIGS. 1 and 2 illustrate part of a device 16 for recording and reading magnetic data, including a magnetic disk 18 rotatable about a spindle axis. The disk has a substantially planar data surface 20, i.e. a horizontal upper surface. A rotary actuator (not shown) supports and pivots a cantilevered transducer support arm 22. A magnetic data transducing head or slider 24 is mounted to the free end of support arm 22, through a suspension 26. This permits a gimballing action of the slider, i.e. limited vertical travel and rotation about pitch and roll axes. The arm pivots to move slider 24 in an arcuate path, generally radially with respect to disk 18 as indicated generally at 28.

At its center, disk 18 has an opening to accommodate a shaft 30 of a disk drive spindle operable to rotate the disk counterclockwise as indicated at 32. Rotation of the disk and pivoting of arm 22 are controlled in concert to selectively position transducing slider 24 at desired locations along data surface 20 for reading and recording operations. During such operations there is no slider/disk contact. Rather, air near data surface 20 travels with the rotating disk due to friction, and flows between data surface 20 and slider 24 to form an air bearing or cushion that supports the slider spaced apart from the data surface.

Figure 3:
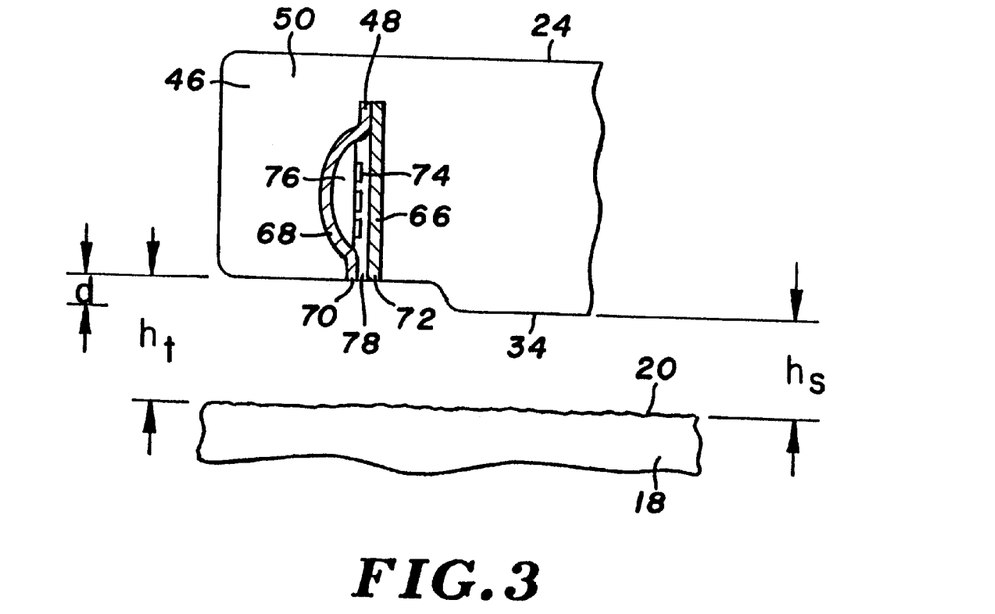
FIG. 3 is an enlarged view showing a transducing region of a magnetic head slider of the device.

As is known in the art, slider 24 is formed with an air bearing surface 34 which, when counterbalanced by a downward load on the slider from arm 24 through suspension 26, maintains the slider at a substantially constant distance above surface 20, known as a "flying height". The slider flying height, designated $h_s$, in FIG. 3, is substantially constant over the normal range of disk rotational speed during reading and recording. Deceleration of disk 18 causes slider 24 to come to rest on the disk.

To achieve low slider flying heights, data surface 20 preferably is extremely smooth. However, slider contact with extremely smooth media surfaces can cause friction and dynamic stiction. Accordingly, disk 20 includes an annular slider contact zone 36 at the radially inward edge of data surface 20. The contact zone is texturized, i.e. roughened to enhance its resistance to stiction and friction.

When disk 18 is decelerated after a reading or recording operation, arm 22 is pivoted to position slider 24 adjacent contact zone 36, so that when the slider comes to rest it engages the contact zone rather than surface 20. Likewise, to initiate operations disk 18 is accelerated to a degree sufficient to establish aerodynamic support of the slider before the slider is moved radially away from the contact zone. Thus, in normal usage slider 24 contacts the disk only along contact zone 36.

As noted above, improved designs have enabled reduction in slider flying heights from about 10 microinches to just under 4 microinches. Dedicated slider contact zones allow smoother data surfaces and are expected to allow further reductions, perhaps to a range of 1.5–2 microinches. At the same time, data surface roughness, tolerances in slider fabrication and in slider support structure manufacture and assembly, and unpredictable air bearing disturbances, all present more serious difficulties as slider-to-disk spacing is diminished. Also, the normal expansion and contraction of components due to changes in temperature have a more pronounced impact at lower slider flying heights.

Accordingly, slider 24 incorporates structure for supporting a transducer for movement toward and away from air bearing surface 34. Further, device 16 incorporates control circuitry for displacing the transducer away from surface 34 toward data surface 20, reducing the transducer/disk spacing (i.e. a transducer flying height $h_t$ in FIG. 4) without reducing the slider flying height.

With reference to FIG. 2, transducing slider 24 includes a slider body 38 formed primarily of a ceramic material, e.g. a combination of alumina (aluminum oxide, $Al_2O_3$) and titanium carbide (TiC), a substantially crystalline structure. At its leading edge 40, slider body 38 is beveled as indicated at 42. Near a trailing edge 44 is a transducing region 46 of the slider, including a magnetic transducer 48 substantially encapsulated in amorphous aluminum oxide 50 but with an exposed pole tip region 52. The distance between pole tip region 52 and surface 20 is a transducer flying height. Due to differences in materials, particularly as to their thermal expansion properties, transducing region 46 and slider body 38 expand at different rates in response to a given temperature increase. Consequently, heating slider 24 displaces pole tip region 52 relative to air bearing surface 34, which can be thought of as a reference surface of the aerodynamically positioned and oriented slider.

Returning to FIG. 1, device 16 includes a control circuit 54 for heating slider 24 a desired amount. Control circuit 54 is distinct from servo transducer positioning control circuitry, which is not shown. As indicated by an external input 56, control circuit 54 is programmable to provide a selected level of power to the slider to heat the slider to a selected temperature. The control circuit includes a d.c. power source 58 for providing an electrical current to a resistance heating element 60 mounted to slider body 38. The heating element can be mounted at a variety of locations, preferably near transducing region 46 and in a manner that minimizes its influence on the aerodynamic properties of the slider. Heat is generated in an amount that varies with the current through heating element 60. Power source 58 is adjustable to vary the amount of current through the heating element and thus vary the amount of heat generated.

A sensor 62, e.g. a thermocouple, is mounted to arm 22 near slider 24. The sensor provides its output to a sensing circuit 64 (FIG. 1). The sensing circuit in turn generates temperature values based on sensed temperatures and provides the temperature values to control circuit 56. Accordingly, the control circuit governs heat generation based on preprogrammed inputs, and also can adjust the amount or heating in response to sensed temperatures.

FIG. 3 shows transducing region 46 in greater detail. Magnetic transducer 48 includes pole regions 66 and 68 formed of a magnetic material, e.g. permalloy (NiFe), TaCoPt, or FeAlSi, and having pole tips 70 and 72, respectively. Conductive windings 74, preferably copper, are disposed between the pole regions. A photoresist 76, e.g. a polymer, occupies the space between the pole regions, securing the windings and determining a gap 78 between the pole regions at the pole tips. The pole regions and intermediate layers of the transducer are encapsulated in the amorphous aluminum oxide 50. At an ambient temperature, transducing slider 24 exhibits pole tip recession, i.e. the transducer flying height is greater than the slider flying height by the amount "d".

Figure 4:
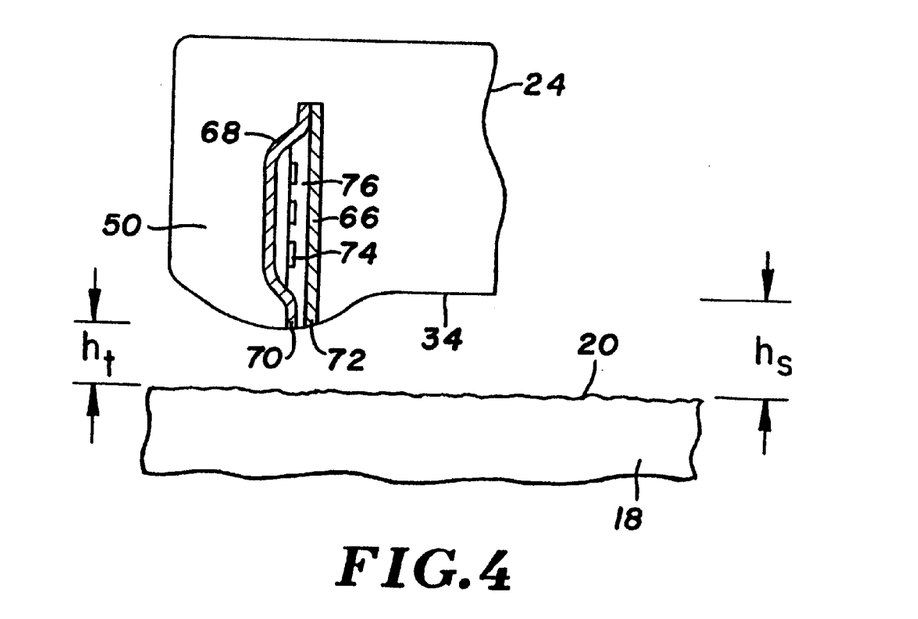
FIG. 4 is an enlarged view similar to FIG. 3, showing the transducing region at an elevated temperature.

FIG. 4 illustrates the transducing region with slider 24 at an elevated temperature. The slider body ceramic and amorphous alumina have similar thermal expansion coefficients. The transducer, primarily because of the photoresist material, has a higher thermal expansion coefficient than the remainder of the slider. Consequently, when heated, pole tips 70 and 72 are displaced downwardly relative to air bearing surface 34. Displacement of the pole tips occurs primarily due to expansion of the transducer, and more precisely because the transducer expansion rate exceeds that of the surrounding slider body. As transducer 46 thermally expands, it tends to elastically expand the adjacent aluminum oxide. The aluminum oxide at the same time tends to elastically deform (compress) the transducer. Thus, pole tip displacement is a product of elastic deformation as well as thermal expansion. The entire displacement can be considered as "thermally induced".

Figure 5:
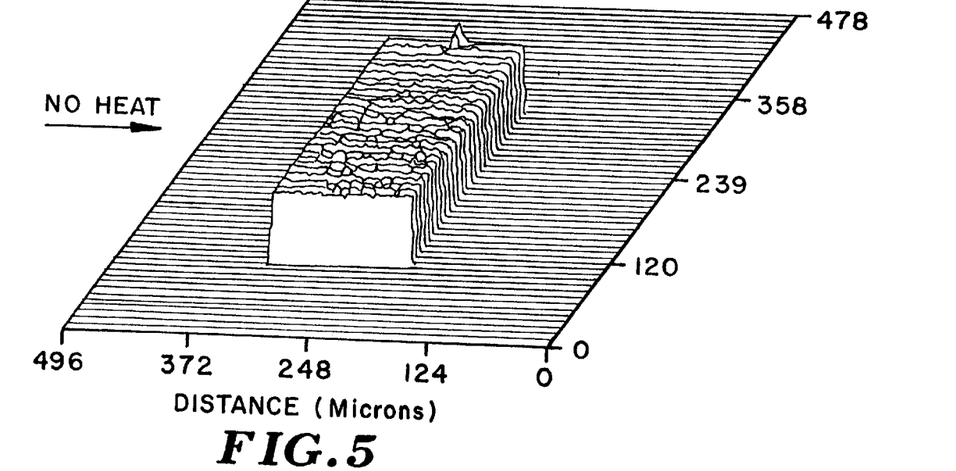
FIGS. 5 and 6 are three dimensional traces of the transducing region.
Figures 6, 6A:
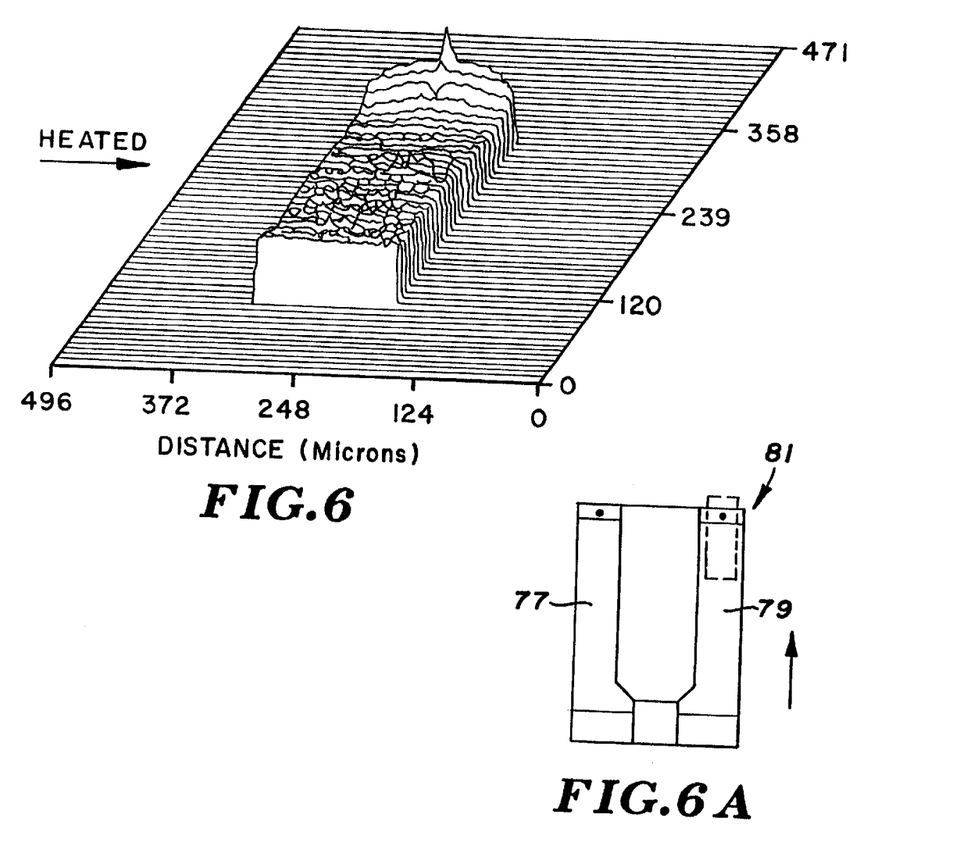
FIG. 6A is a bottom view of the slider illustrating the region from which the traces are taken.

FIGS. 5 and 6 are three dimensional (Wyko Topo-3D) plots of the pole region of a slider substantially identical to transducing slider 24. The slider was inverted to create the traces, so that the protrusion of pole tips at an elevated temperature appears as an upward extension. The traces in FIG. 5, taken at 20 degrees C., show virtually no protrusion. By contrast, the traces in FIG. 6, taken at temperatures in the range of 100–150 degrees C., show substantial upward protrusion of the pole region. The bottom plan view of the slider in FIG. 6A points out the area from which the pole region traces are taken, i.e. along one of two parallel skis 77 and 79, more particularly at the trailing edge region 81 of ski 79.

Figure 7:
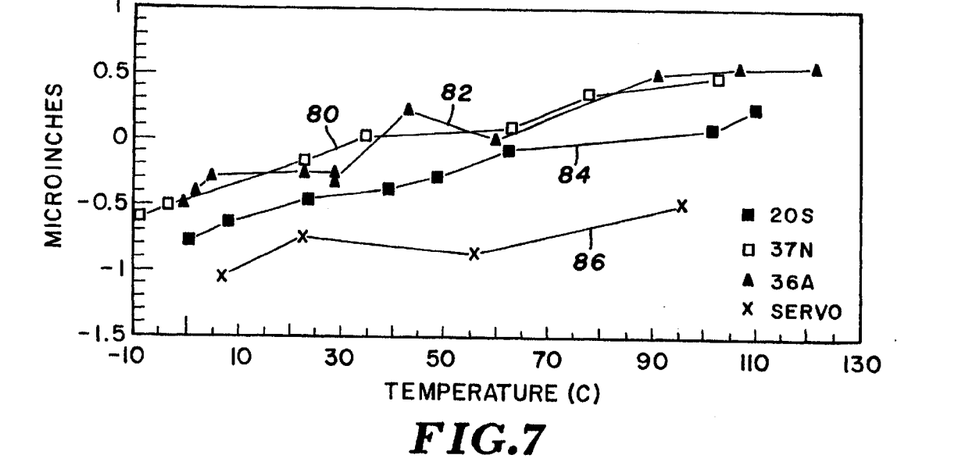
FIG. 7 is a chart illustrating changes in pole tip recession with changes in slider temperature.

FIG. 7 is a chart with curves 80, 82, 84 and 86 illustrating thermally induced pole tip displacement in connection with four different transducing sliders. The zero on the vertical scale (microinches) signifies equality of the transducer and slider flying heights. Values below zero indicate pole tip recession. In all cases, heating the slider reduces pole tip recession. In three of the four cases, heating was sufficient to cause a pole tip protrusion with respect to the air bearing surface, with transitions (i.e. zero crossings) occurring over a range of about 32–80 degrees C. Curve 86 is associated with a servo transducing slider. Structural differences as compared to the other transducing sliders contribute to the more pronounced pole tip recession, although natural variation in samples also is a factor.

It is to be appreciated that in spite of the temperature changes, the slider flying height tends to remain essentially constant. Accordingly, a displacement in pole tips 70 and 72 measured with reference to air bearing surface 34, and the corresponding reduction in transducer flying height are essentially the same.

Figure 8:
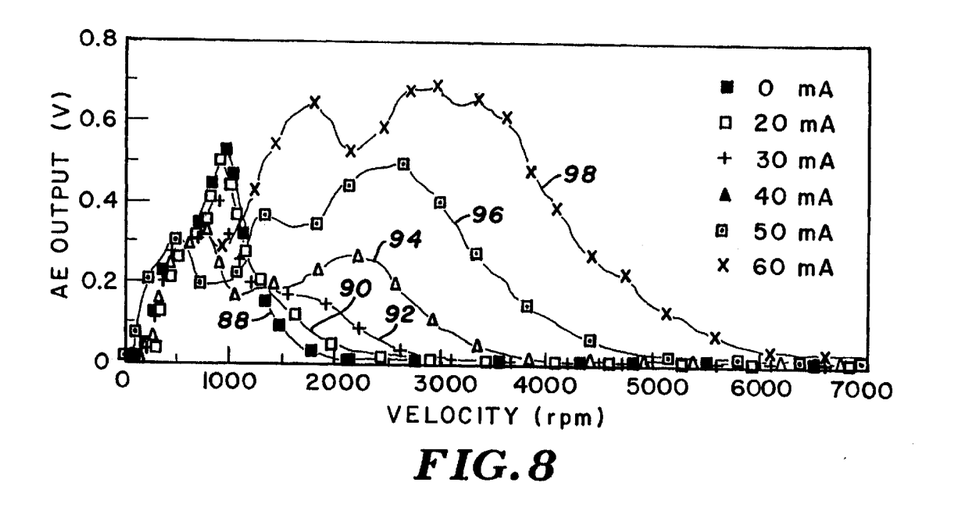
FIG. 8 is a chart illustrating the change in acoustic signals as a disk is accelerated from stop, for several different levels of current applied to the slider.

In connection with FIG. 8, a magnetic disk similar to disk 18 was accelerated from a stop with a transducing slider similar to slider 24 at rest on the disk, with the slider in each case eventually disengaging from the disk and becoming aerodynamically supported. The vertical scale represents acoustic energy output in volts, as sensed by a transducer on the slider. The horizontal scale represents rotational velocity in revolutions per minute.

Several traces represent different levels of current supplied to the slider and therefore represent different levels of slider heating. Trace 88 represents the absence of heating, i.e. no current applied to the resistance heating element. Traces 90, 92, 94, 96 and 98 represent current to the heating element of 20 mA, 30 mA, 40 mA, 50 mA and 60 mA. Each trace shows an increase in acoustic noise as the disk begins to accelerate. The noise peaks and descends, eventually returning to about zero to signify that the transducer has disengaged from the disk surface.

The unheated slider (trace 88) breaks free at the lowest velocity, i.e. about 2000 rpm. Traces 90–98 show that as the slider is maintained at higher temperatures, corresponding to the increased current levels, the return to an acoustic output of about zero occurs at increasingly greater disk velocities. Thus, the traces in FIG. 8 confirm the existence of pole tip protrusion in response to heating and further confirm that the amount of protrusion increases with slider temperature.

In FIG. 8, the acoustical noise output is a function of contact of a transducer with the surface of the disk, which is influenced by roughness of the surface as well as the degree of transducer pole tip protrusion. Thus, in connection with magnetic disks that include contact zones such as zone 36, the results suggest that heating of the slider should be delayed until arm 22 has carried the slider radially away from the contact zone, so that the pole tips remain recessed until the slider is positioned over the much smoother data surface.

Figure 9:
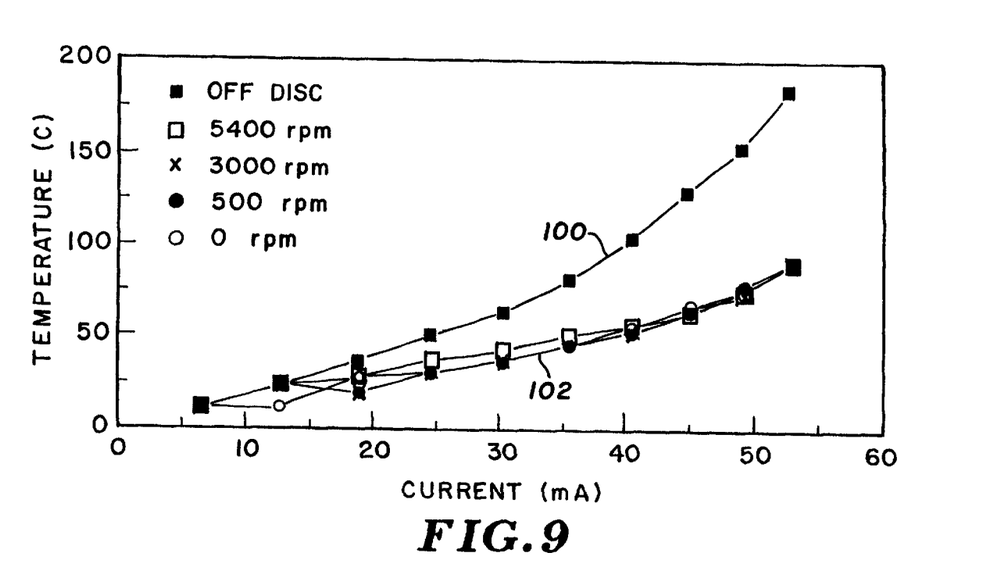
FIGS. 9 and 10 are charts illustrating a temperature increase in the slider accompanying increases in current and power, respectively.
Figure 10:
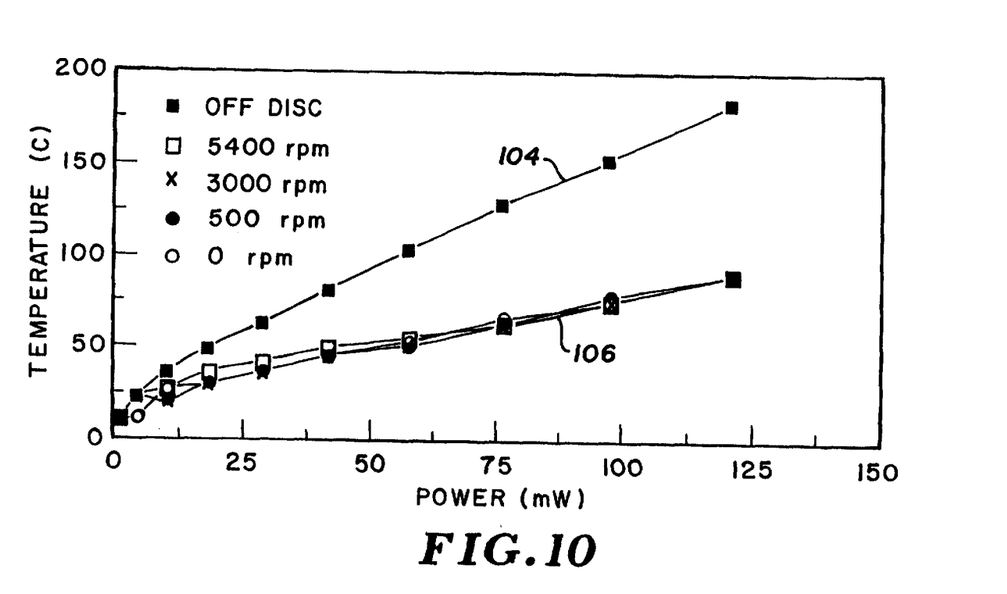

FIGS. 9 and 10 illustrate the efficacy of generating current to heat aerodynamically supported transducing sliders. Curve 100 is a plot of slider temperature as a function of current through the slider resistance heating element, with the slider aerodynamically supported, i.e. free of the disk. Curve 102 likewise shows the slider aerodynamically supported, but maintained at a much closer spacing from the disk, i.e. in the sub 10 nm range. Curve 102 represents episodes of slider support at different speeds: 500 rpm, 3000 rpm and 5400 rpm. Thus, curve 102 demonstrates that heat losses from the slider are essentially constant over the range of velocities tested. A comparison of curves 100 and 102 demonstrates a considerably enhanced heating efficiency when the slider is relatively free of the disk.

FIG. 10 is a plot of slider temperature as a function of power (rather than amperage) to the resistance heater. A curve 104 representing an aerodynamically supported slider, and a curve 106 representing the slider, again at a much closer spacing from the disk at several velocities, confirm the result shown in FIG. 9, and demonstrate a linear relationship between increases in temperature and power, particularly above about 50 degrees C.

Figure 11:
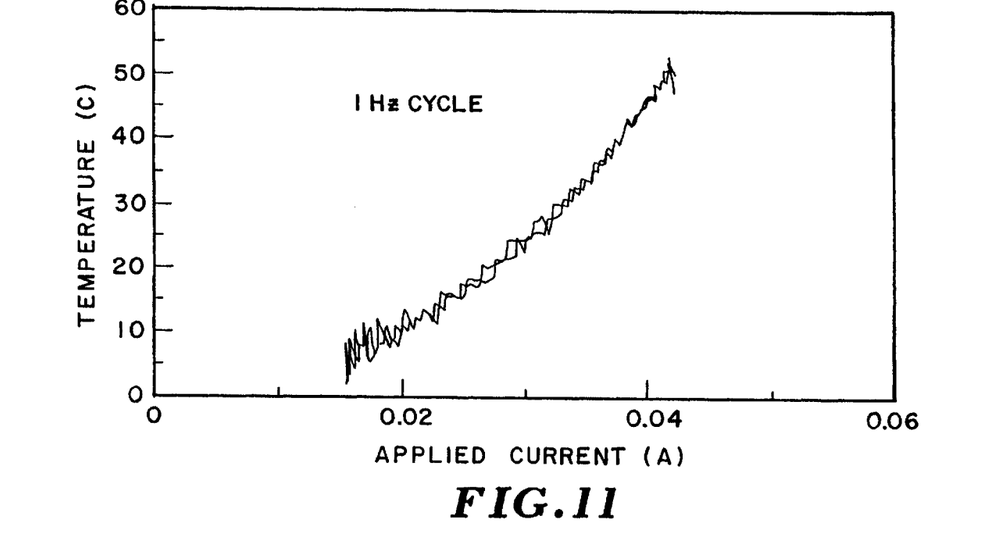
FIGS. 11 and 12 are charts illustrating slider temperature changes in response to cyclical variations in the applied current.
Figure 12:
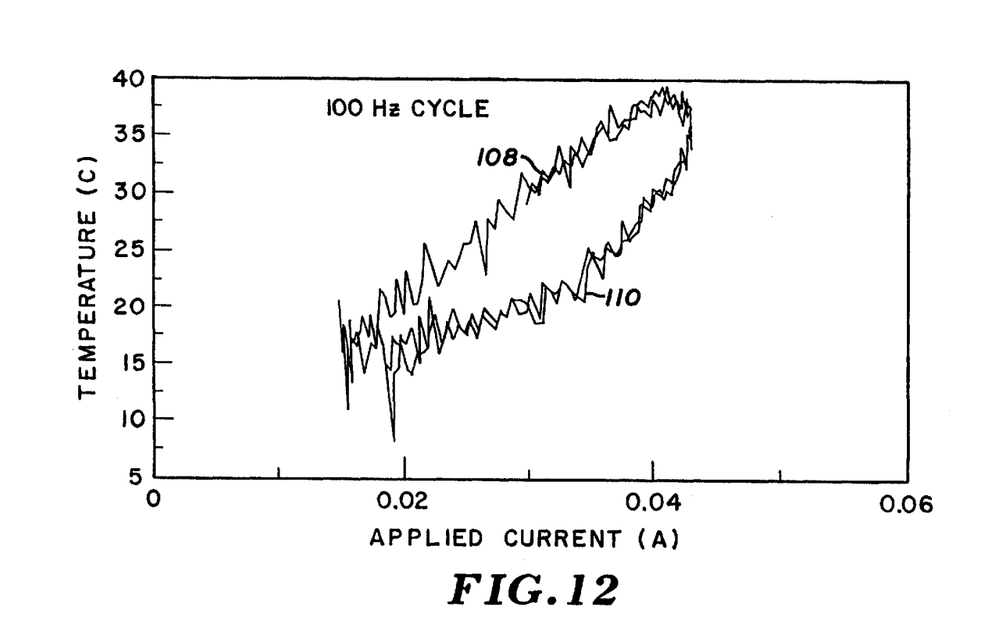

FIGS. 11 and 12 are plots of slider temperature as a function of applied current when applied current is cyclically varied. More particularly, in FIG. 11 the applied current is varied sinusoidally at aL frequency of 1 Hz. Portions of the curve relating to increases in current and decreases in current substantially overlap, indicating the temperature tracks current closely.

In FIG. 12, the sEinusoidally varying current is based on a frequency of 100 Hz. The curve includes readily distinguishable upper and lower portions 108 and 110 corresponding to an amperage increase and an amperage reduction, respectively. The hysteresis loop at 100 Hz shows that a steady state is not attained at the higher frequency.

Figure 13:
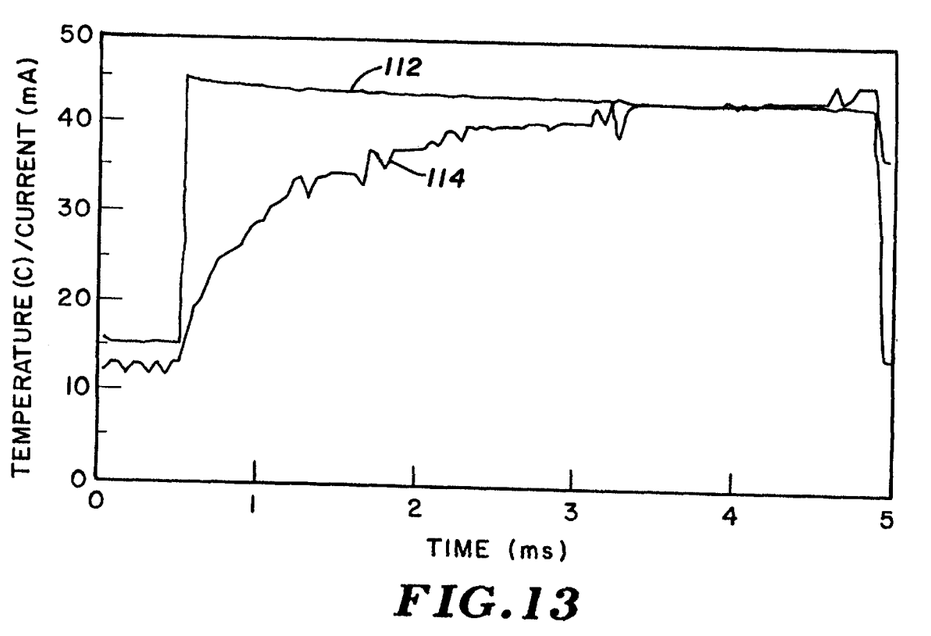
FIG. 13 is a chart illustrating the timing of a temperature change responsive to an abrupt change in applied current.

FIG. 13 illustrates the application of current as a square wave at about 45 mA as indicated at 112. A plot 114 shows the temperature increase caused by the increased amplitude. While there is a slight lag in the temperature response, the temperature reaches its steady state of about 45 degrees C. within about 3 ms, and achieves about 80% of its change to the steady state level withiLn about 1 ms. For a disk rotating at 5400 rpm, a single revolution requires about 12 ms. Thus the target temperature is achieved within about one-fourth of a revolution. Even at substantially greater speeds, e.g. 10,000 rpm, the lag time remains less than one-half of a disk revolution. With smaller slider designs there is a potential to further reduce lag time.

Figure 14:
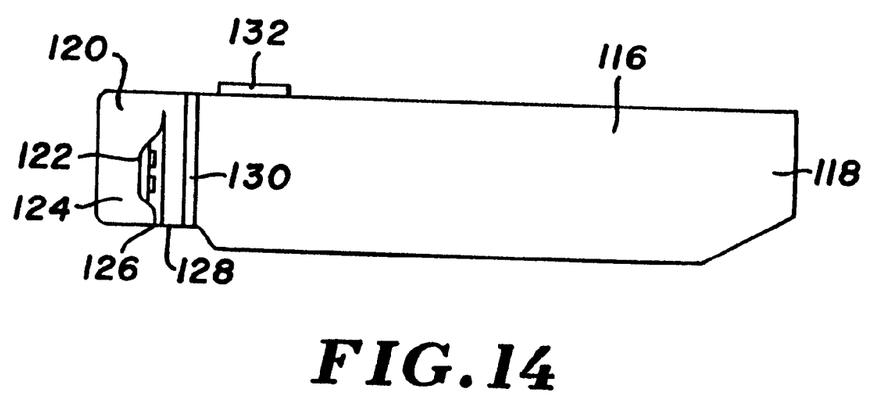
FIGS. 14 and 15 illustrate an alternative embodiment magnetic transducing slider, before and after an operating temperature increase.
Figure 15:
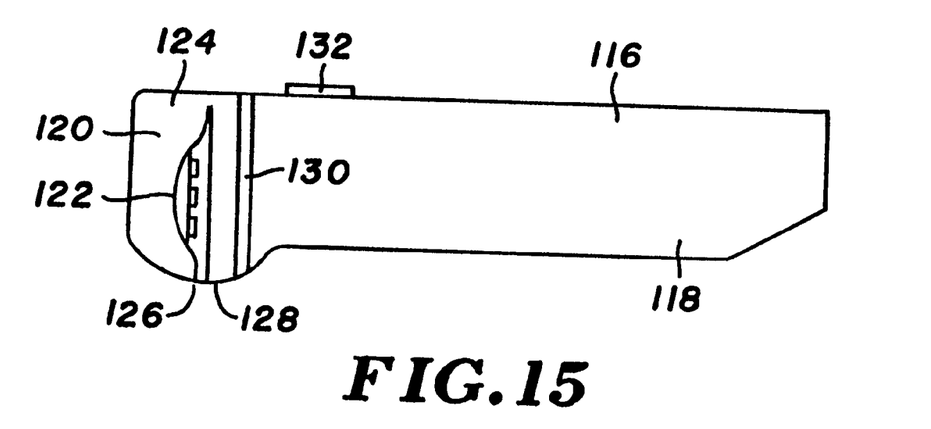

FIGS. 14 and 15 illustrate an alternative transducing slider 116 including a ceramic slider body 118 and a transducing region 120 along the trailing edge of the transducer. A transducer 122 is substantially embedded within amorphous aluminum oxide 124, with pole tips 126 and 128 exposed in the same manner as with transducing slider 24. A resistance heater 130, in the form of a strip, is embedded within the slider just ahead of the transducer and forms a border between transducing region 120 and the remainder of the slider, at least across the ski on which the transducing region is formed. As before, heating element 130 is coupled to a variable power source that varies the amount of heat generated by varying the electrical current through the heating element. A temperature sensor 132 is shown mounted to the top of slider 116 as a matter of convenience. The sensor could readily be mounted to a slider support arm or elsewhere, the primary requirement being a location near the slider.

Heating element 130 preferably is formed of a material with a high temperature coefficient of thermal expansion, e.g. aluminum or copper. Alternatively, known photoresist materials having high thermal expansion coefficients and high moduli of elasticity can be employed. In either event, heating element 130 provides the necessary increase in temperature and also plays a direct role in pole tip displacement. In particular, heating element 130 expands in its own right as it provides heat to expand the adjacent materials. Heating element 130 cooperates with transducer 122 to elastically expand the adjacent slider material, i.e. the aluminum oxide. Thus, heating element expansion augments transducer expansion in more effectively displacing the pole tips.

While FIG. 7 indicates a transducing tip region displacement of about 0.01 microinches per degree C., a slider can be fabricated with considerably enhanced temperature sensitivity, e.g. about 0.03 microinches per degree C.

The following example illustrates how temperature control of thermally responsive magnetic transducing sliders can be used in environments that demand a narrow range of transducer flying heights, even though the sliders may exhibit a broad range of slider flying heights. For this example, assume the design slider flying height is 2.9 microinches. A fabricated batch of sliders yields a mean flying height equal to the desired value, with a standard deviation of 0.2 microinches, for "3 σ maximum and minimum flying heights of 3.5 microinches and 2.3 microinches. Further, assume that the transducing sliders exhibit neither pole tip recession nor pole tip protrusion at ambient temperature (20 degrees C.), and that intended use is at ambient temperature.

The change in temperature necessary to achieve the desired transducer displacement can be determined according to the equation:

$$\Delta t = \Delta h / s$$

where $\Delta h = h_s - h_t$, (slider flying height minus desired transducer flying height); and s is the temperature sensitivity, i.e. 0.03 microinches/degree C. For a slider with a flying height $h_s$ of 2.9 microinches and a desired transducer flying height $h_t$ of 0.5 microinches, the above formula yields a need to change the temperature by 80 degrees. The appropriate slider operating temperature is 100 degrees C., i.e. ambient plus 80 degrees C.

Further applying the above formula, a slider having a flying height at the upper end of the range (3.5 microinches) would be heated to an operating temperature of 120 degrees C., while a slider with a flying height at the lower end of the range would be heated to a temperature of only 80 degrees C.

Of course, the actual slider flying height is determined before finding the appropriate operating temperature. Accordingly, each transducing slider is tested to determine its flying height. The slider can be tested following mounting to its support arm and suspension, on testing equipment known to those in the art. Alternatively, the transducing slider can be tested in situ in the assembled disk drive. In either case, slider flying height is determined by monitoring signals generated by the transducer, for example to measure high frequency amplitude or pulse widths at one-half of peak amplitudes, or by overwrite optimization. This actually measures transducer flying height, although in this example transducer flying height and slider flying height are the same at ambient temperature.

Upon measuring the individual slider flying height, the appropriate slider operating temperature is determined, either according to the above formula or by heating the slider during further in situ testing. In either event, a value representing the selected operating temperature, or the selected difference in temperature (amount of heating), is stored to a memory in control circuit 54 via external input 56. This sets the control circuit to heat the slider to the predetermined temperature during reading and recording operations.

Thus, an appropriate operating temperature or amount of heating is predetermined with respect to each slider individually, enabling reading and recording operations over a narrow range of transducer flying heights, despite a broad range of corresponding slider flying heights.

It is to be appreciated that the slider heating is localized to the region of the transducer. It requires very little energy, e.g. about 20–70 mA of current and about 50–200 milliwatts of power, with the precise requirements based on the slider design. Power requirements also are occasional and of short duration, since reading and recording operations typically require a small fraction of total drive operating time. Finally, the localized heating presents no risk of damage to surrounding components, nor does it have an impact on the temperature ranges under which the drive can be efficiently used.

Operating the drive at other than ambient temperatures requires an adjustment in the amount of heating required for a transducer displacement. Given an example identical to the above, except that the disk drive is expected to operate at about 5 degrees C. rather than 20 degrees C., a change in temperature $\Delta t$ of 95 degrees rather than 80 degrees is necessary to achieve the desired operating temperature of 100 degrees C. Conversely, if expected disk operating temperatures are about 55 degrees C., the required change in temperature is only about 45 degrees C. In each of these cases, temperature sensor 62 (or 132) can be used to provide temperature value inputs to the control circuit.

Finally, consider an example identical to the first above except that the sliders have a 0.1 microinch pole tip recession at ambient temperature. Then, a transducing slider with the mean slider flying height of 2.9 microinches, when heated to 100 degrees C., would yield a transducer flying height of 0.6 microinches, and of course would yield the desired 0.5 microinches upon a temperature increase to about 103 degrees C.

The ability to thermally displace the transducer, i.e. cause the pole tips to protrude toward the data recording surface relative to an air bearing surface or other reference surface, yields several advantages. First, in magnetic media having contact zones, such zones can be textured to a roughness much greater than a designed transducer flying height, yet less than the corresponding slider flying height. Slider temperatures can be controlled to cause the pole tips to protrude only when the slider is adjacent the much smoother data surface. There is no need to reduce contact zone roughness to accommodate the lower transducer flying height, and thus risk an increase in stiction and dynamic friction. Secondly, the difference in slider and transducer flying heights enables a higher slider flying height during a "sleep" mode irn which the slider is in an idled state over the moving medium, neither recording nor reading data. The transition from a read/record mode to the sleep mode is accomplished by reducing slider operating temperature to retract the pole tips, with virtually no change in the slider flying height. Reliability is enhanced because of the higher slider flying height.

The temperature responsive slider also affords fabrication and performance advantages as compared to the prior piezoelectric electric approaches. Fabrication of temperature responsive sliders involves less complexity and expense. Temperature controlled transducer displacements do not require the high activation voltages characteristic of piezoelectric designs. Moreover, the substantially linear relationships of displacements to temperature changes, and temperature changes to applied power (or square of the applied current), afford precise control of position adjustments.

The addition of temperature sensing proximate the slider provides virtually instantaneous sensing of transducer position. It also provides a means for determining the transducer position without generating signals using the transducer. Thus, the transducer position can be sensed when the slider is positioned over a contact zone or any other media surface area that does not incorporate magnetic data.

Further in accordance with the present invention, the transducing element and its immediate region in a magnetoresistive (MR) head likewise can be selectively heated for a controlled, thermally induced displacement relative to the remainder of the head. Preferably heat is generated through a separate resistance heating element mounted to the head near the transducing element. As an alternative approach, a bias could be applied to the transducing element. This alternative is not as preferred, however, because higher bias levels may cause electro-migration in the transducing element, and higher bias currents may affect transducing head sensitivity.

Thus in accordance with the present invention, a transducing slider incorporates a transducing region with a thermal expansion coefficient different than that of the surrounding material, so that pole tip displacement relative to the slider body can be thermally controlled. A:n operating temperature of the slider can be set to achieve a predetermined amount of pole tip protrusion, establishing a transducer flying height much closer than the flying height of the slider. Higher data storage densities due to lower transducer flying heights are realized without the problems associated with reduced slider flying heights. A temperature control circuit is variable to set the slider operating temperatures over a range sufficient to compensate for the normal variations in slider flying heights typical of batch fabricated sliders, for substantial improvements in yield. Further advantages arise from incorporating a slider temperature sensing means, including using such means to confirm in situ transducer position adjustments and to determine transducer flying height without measuring signals generated by the transducer.

What is claimed is:

1. An air bearing slider including:
   a slider body having an air bearing surface for aerodynamically supporting the slider body in an operating position in which the air bearing surface is spaced apart from a data surface of a magnetic data reading and recording medium by a nominal flying height;
   a magnetic transducer supported with respect to the slider body near the air bearing surface, for movement toward and away from the air bearing surface in response to changes in an operating temperature of the slider body proximate the transducer; and
   a transducer spacing controller for controlling the operating temperature when the slider body is in the operating position, to adjust a position of the transducer relative to the air bearing surface, thereby to determine a separation distance between the transducer and the data surface independently of the nominal flying height.

2. The slider of claim 1 wherein:
   said controller includes a resistance heating element mounted to the slider body.

3. The slider of claim 2 wherein:
   said transducer is incorporated within a transducing region of the slider having a first thermal expansion coefficient, said slider body is formed of a second material having a second thermal expansion coefficient less than said first thermal expansion coefficient, and the displacement of said transducer is caused by thermal expansion of the transducing region and the slider body at respective and different rates in response to a given increase in temperature.

4. The slider of claim 1 further including:
   a thermally expansive material mounted to the slider body proximate the transducer and forming a thermal expansion region having a higher thermal expansion coefficient than the slider body, and means for applying a bias current to the thermally expansive material, to heat the thermally expansive material and thereby cause the thermally expansive region and adjacent portions of the slider body to expand.

5. The slider of claim 4 wherein:
   the transducer is mounted proximate a trailing edge of the slider body, and the thermally expansive region comprises a strip of the thermally expansive material substantially encapsulated within the slider body forwardly of the transducer.

6. The slider of claim 1 wherein:
   the controller comprises a heating element for generating heat in amounts that vary with an electrical current through the heating element, and a variable current source electrically coupled to the heating element.

7. The slider of claim 6 further including:
   a temperature sensing means for sensing said operating temperature and providing a sensing input to the variable current source based on said operating temperature.

8. A magnetic data reading and recording apparatus, including:
   a magnetic transducing slider having an air bearing surface, and a transducer positioned near the air bearing surface, and mounted for movement toward and away from the air bearing surface;
   a slider support means for aerodynamically supporting the slider proximate a data surface of a magnetic data reading and recording medium wiLth the air bearing surface confronting the data surface and spaced apart from the data surface by a nominal distance;
   a temperature sensing means for sensing an operating temperature of the slider and generating a sensor output based on the operating temperature; and
   a transducer positioning means, operably coupled to the sensing means, for controlling a position of the transducer with respect to the air bearing surface responsive to the sensor output.

9. The apparatus of claim 8 wherein:
   said transducer positioning means includes a heating element mounted to the slider for generating heat to displace the transducer relative to the air bearing surface by thermally induced expansion.

10. The apparatus of claim 9 wherein:
    said slider has a slider body with a first coefficient of thermal expansion, and said transducer is disposed within a transducing region substantially encapsulated within the slider body and having a second thermal expansion coefficient greater than the first thermal expansion coefficient.

11. The apparatus of claim 10 wherein:
    said transducer is mounted to the slider body near a trailing edge thereof, and said heating element comprises an electrically conductive resistance heating element at least partially encapsulated within the slider body proximate the transducer.

12. The apparatus of claim 11 wherein:
    said control means comprises a variable current source electrically coupled to the resistance heating element.

13. In a magnetic data reading and recording apparatus including means for aerodynamically supporting a magnetic transducing slider in spaced apart relation to a data surface of a magnetic data reading and recording medium, a process for determining a transducer spacing, including:

supporting a magnetic transducing slider aerodynamically in spaced apart relation to a data surface of a magnetic data reading and recording medium, with an air bearing surface of the slider confronting the data surface and spaced apart from the data surface by a nominal distance;

while so supporting the slider, measuring a transducer spacing between a transducer supported by the slider and the data surface;

comparing the measured transducer spacing with a desired transducer spacing; and responsive to a difference between the measured transducer spacing and the desired transducer spacing, changing an operating temperature of the slider to change a distance between the transducer and the air bearing surface while maintaining the slider at said nominal spacing, thereby to displace the transducer toward the desired transducer spacing.

14. The process of claim 13 wherein:

said measuring of the transducer spacing includes measuring at least one of the following:

a transducer signal amplitude, a pulse width, and an acoustic output.

15. The process of claim 13 wherein:

the magnetic transducing slider includes a slider body having a first thermal expansion coefficient, and a transducing region incorporating said transducer and having a second thermal expansive coefficient greater than the first thermal expansion coefficient; and wherein said changing of the operating temperature includes heating the slider at least at and near the transducing region to expand the transducing region and the slider body, with a difference in the rates at which the transducing region and slider body expand increasing a distance by which the transducer protrudes away from the air bearing surface toward the reading and recording surface.

16. The process of claim 13 wherein:

said changing of the operating temperature includes providing an electrical current to a resistive heating element mounted to the slider.

17. The process of claim 13 further including:

sensing said operating temperature, generating sensed temperature values based on the sensed operating temperature, and adjusting the operating temperature based on the sensed values.

18. A process for adjusting a flying height of a transducer mounted to a magnetic head slider while aerodynamically supporting the slider with a reference surface of the slider spaced apart from a data recording surface by a nominal distance, including:

aerodynamically supporting a magnetic transducing slider with respect to a data surface of a magnetic reading and recording medium with a reference surface of the slider spaced apart from the data surface by a nominal distance, and with a magnetic data transducer carried by the slider exposed to confront the data surface while being spaced apart from the data surface;

sensing an operating temperature of the slider and generating temperature values based on the sensed operating temperature; and responsive to the temperature values, displacing the transducer relative to the reference surface to control a transducer spacing between the transducer and the data surface.

19. The process of claim 18 wherein:

said displacing of the transducer relative to the reference surface is accomplished by heating the slider at least at a region thereof near the transducer.

20. The process of claim 18 wherein:

the slider includes a slider body with a first thermal expansion coefficient, and the transducer is mounted within a transducing region substantially encapsulated within the slider body and having a second thermal expansion coefficient greater than the first thermal expansion coefficient, and wherein the displacing of the transducer includes causing a thermally induced elastic deformation of the slider body and the transducing region.

21. The process of claim 18 wherein:

the displacing of the transducer includes providing a variable electrical current to a resistance heating element mounted to the slider.

22. A magnetic data reading and recording apparatus including:

a magnetic transducing slider including a slider body having a reference surface, and a transducer mounted with respect to the slider body near the reference surface for movement toward and away from the reference surface responsive to changes in an operating temperature of the slider;

a means for aerodynamically supporting the slider in an operating position with the reference surface spaced a nominal distance from a data surface of magnetic data reading and recording medium; and a transducer spacing control means operatively associated with the slider, for adjusting said operating temperature to displace the transducer with respect to the reference surface, thereby to adjust a spacing between the transducer and the data surface independently of said nominal distance.

23. The apparatus of claim 22 wherein:

said control means is operable in an active state in which the transducer protrudes from the reference surface toward the data surface for a data reading and recording mode, and a passive state in which the transducer is retracted toward the reference surface corresponding to mode other than data reading and recording.

24. The apparatus of claim 22 further including:

a sensing means for detecting the operating temperature and for generating temperature values based on the operating temperature, wherein the control means is operatively associated with the sensing means to receive the temperature values and adjust the operating temperature based on the temperature values.

25. The apparatus of claim 22 wherein:

said control means includes a resistance heating element mounted to the slider, and a variable electrical current source coupled to the heating element.

26. The apparatus of claim 25 wherein:

said heating element is formed of a material with a thermal expansion coefficient greater than a thermal expansion coefficient of the slider body, is embedded in the slider body proximate the transducer, and expands when heated to elastically deform the slider body and thereby displace the transducer.

27. The apparatus of claim 25 wherein:

the slider includes a slider body having a first thermal expansion coefficient, and a transducing region adjacent the slider body and having a second thermal expansion coefficient greater than the first thermal expansion coefficient; and said heating element generates heat to expand the transducing region at a different rate than the slider body, thereby displacing the transducer.

28. A process for establishing a transducer flying height for a magnetic transducer carried by an aerodynamic slider body in a magnetic data reading and recording apparatus, including:

while maintaining a magnetic transducing slider aerodynamically supported over a moving magnetic recording medium, measuring a transducer flying height of a magnetic transducer carried by the slider while maintaining the slider at a first temperature, to obtain a first transducer flying height corresponding to the first temperature;

comparing the first flying height to a predetermined desired flying height;

while aerodynamically supporting the slider, changing the temperature of the slider to a second temperature selected to change a distance between the magnetic transducer and a reference surface of the slider thereby to change the transducer flying height to a second flying height nearer to the predetermined desired flying height; and storing an indication of the second temperature to a memory in the data reading and recording apparatus, for use in cooperation with a temperature control means to maintain the slider temperature at said second temperature during data and reading recording operations.

29. The process of claim 28 further including:

sensing an ambient temperature of the reading and recording apparatus to generate an ambient temperature reading, and providing the ambient temperature reading as an input to the temperature control means.

30. The process of claim 28 wherein:

said measuring of the first transducer flying height includes generating electrical signals with the transducer and measuring at least one of the following features related to the electrical signals: signal amplitude, signal pulse width at 50 percent peak amplitude, and acoustic energy.

31. The process of claim 28 wherein:

the second transducer flying height is substantially equal to the predetermined desired flying height.

32. An air bearing slider including:

a slider body supportable aerodynamically relative to a magnetic data reading and recording medium in an operating position in which a reference surface of the slider body is spaced apart from a data surface of the magnetic data reading and recording medium by a nominal distance, said slider body including a transducing region near the reference surface;

a magnetic transducing means supported by the slider body at the transducing region and displaceable relative to the slider body toward and away from the reference surface in response to changes in an operating temperature of the slider near the transducing region; and a temperature control means for changing said operating temperature to displace the transducing means with respect to the reference surface, and thereby change a spacing between the transducer and the data surface without substantially altering the nominal distance.

33. The air bearing slider of claim 32 wherein:

said control means ircludes a heater disposed on the slider body proximate the transducing region, to increase the operating temperature and thereby so displace the transducer in a direction toward the data surface.

\* \* \* \* \*